United States Patent [19]

Kowalski et al.

[11] Patent Number: 4,693,926
[45] Date of Patent: Sep. 15, 1987

[54] FLEXIBLE, FIRE-RESISTANT, DECORATIVE LAMINATES AND METHODS OF MANUFACTURE THEREOF

[75] Inventors: Joseph C. Kowalski, Snohomish; Donald A. Mottaz, Issaquah; Berton A. Cole, Bellevue, all of Wash.

[73] Assignee: The Boeing Company, Seattle, Wash.

[21] Appl. No.: 936,461

[22] Filed: Nov. 25, 1986

Related U.S. Application Data

[63] Continuation of Ser. No. 646,570, Aug. 31, 1984, abandoned.

[51] Int. Cl.$^4$ .......................... B32B 3/18; B32B 7/02; B32B 15/08; B32B 31/00
[52] U.S. Cl. .................................. 428/204; 156/123; 156/277; 428/205; 428/209; 428/216; 428/335; 428/421; 428/463; 428/913.3; 428/921
[58] Field of Search ................. 428/920, 13, 211, 251, 428/921, 192, 35, 458, 421, 463, 469, 166, 317.5; 156/277, 123

[56] References Cited

U.S. PATENT DOCUMENTS

| | | | |
|---|---|---|---|
| 3,092,530 | 6/1963 | Plummer | 428/192 X |
| 3,616,192 | 10/1971 | Sinclair | 428/13 |
| 3,655,426 | 4/1972 | Fuchs | 428/469 X |
| 3,677,882 | 7/1972 | Jahns, Jr. | 428/251 |
| 3,767,500 | 10/1973 | Tally | 428/458 |
| 4,170,675 | 10/1979 | Greengrass | 428/920 X |
| 4,282,276 | 8/1981 | Smith | 428/35 |
| 4,292,353 | 9/1981 | Ohashi et al. | 428/211 |
| 4,296,170 | 10/1981 | Ohashi et al. | 428/317.5 |
| 4,395,453 | 7/1983 | Lines, Jr. et al. | 428/216 |
| 4,401,707 | 8/1983 | Bailey et al. | 428/166 |

Primary Examiner—Thomas J. Herbert
Attorney, Agent, or Firm—Hughes & Cassidy

[57] ABSTRACT

Composite, lightweight, flexible, fire-resistant, decorative laminates (10, 10', 10'') suitable for use as wall coverings on bulkhead panels in commercial aircraft include: (i) a laminar fire-resistant layer (15/14) including an aluminum foil sheet (15) bonded to a first inert polyvinyl fluoride sheet (14); (ii) an underlying flexible paper-like base lamination (11); (iii) means (12) for adhesively bonding the first polyvinyl fluoride sheet (14) to the panel-like base lamination (11); (iv) a resinous embossing film (16) overlying and in face-to-face bonded relation to the aluminum foil sheet (15); (v) sheet defining means (18, 18', 18'') having an outer decorative surface and in overlying face-to-face bonded engagement with a resinous embossing film (16); and (vi), an outer transparent sheet (21) of clear polyvinyl fluoride overlying in bonded face-to-face relation with the decorative surface (19, 22) of the sheet defining means (18, 18', 18'').

48 Claims, 3 Drawing Figures

FLEXIBLE, FIRE-RESISTANT, DECORATIVE LAMINATES AND METHODS OF MANUFACTURE THEREOF

This is a continuation of application Ser. No. 646,570, filed Aug. 31, 1984, now abandoned.

BACKGROUND OF THE INVENTION

Technical Field

The present invention relates generally to composite, flexible, fire-resistant, decorative laminates and methods of manufacture thereof; and, more particularly, to improved, flexible, fire-resistant, decorative laminates having the characteristics of flexible, fire-resistant wall coverings which are suitable for use as bulkhead and/or wall panel coverings in the interior passenger compartments of commercial aircraft and the like. For example, when employed as decorative bulkhead panel coverings in commercial aircraft, it is essential that such coverings be capable of meeting—indeed, exceeding—those standards which are established by regulatory agencies in terms of fire resistance and reduced emission of smoke and/or toxic fumes such, for example, as those fire standards developed, promulgated, and from time to time revised, by the FAA and which are more commonly known as Regulation "FAR 25"—standards which are constantly being updated and made more rigorous in terms of those structures that will be approved for use in existing and/or future commercial aircraft. Specifically by way of example, such materials must be capable of meeting, and preferably exceeding, the standards set in Regulation FAR 25.853 wherein the panel is subjected to edge burning by a flame maintained at 1550° F. for a period of 60 seconds and which requires that the material be self-extinguishing after 15 seconds and that it be non-dripping.

Background Art

The present invention arose specifically in connection with the commercial aircraft industry and is intended to meet and exceed minimum fire resistance standards as established by the FAA—standards which are constantly being revised and modified for proposed adoption in connection with existing and/or future aircraft. The materials employed and the specific constructional details disclosed for flexible, fire-resistant, interior, decorative wall covering laminates made in accordance with the present invention provide a synergistic result in terms of minimal weight and cost, reduced propensity to emit smoke and/or toxic fumes, increased durability, increased fire resistance and/or fire retardance characteristics, and increased versatility in terms of usage in specific commercial aircraft environments.

As is well known, today's commercial aircraft are subjected to very stringent requirements in terms of ability to withstand fire and emit minimum quantities of smoke and/or other toxic fumes—standards established by the FAA under Code Regulation "FAR 25". However, this regulatory standard is continuously undergoing review and revision to improve the safety characteristics of the aircraft. The invention is particularly concerned with forming lightweight, flexible, fire-resistant, interior decorative laminates in the form of wall coverings for bulkhead panels and the like in commercial aircraft which will not only meet, but will preferably exceed, the standards that are currently in existence and which will enhance the durability of the coverings and improve their fire-resistant characteristics.

In conventional aircraft available today, it is a common practice to provide decorative wall coverings which are applied to bulkhead panels in the interior passenger compartment, such coverings being made of various types of materials. It has further been known that where such decorative coverings comprise a laminar flexible wallpaper or the like, the incorporation of an aluminum foil barrier film which becomes an integral part of an interior decorative laminate produces a laminate with improved fire-resistant properties. Various efforts have been directed toward producing these types of decorative laminates; but, in general, numerous manufacturing difficulties have been encountered. Thus, the aluminum foil sheets, which may tend to be as thick as 0.0015" have proven extremely difficult to handle without producing wrinkles and/or creases in the foil sheet. Such wrinkles ultimately show up in the finished decorative laminate sheet. In addition, finished decorative laminates including Tedlar—a polyvinylflouride film made by DuPont—and aluminum foil exhibit less texture than desired; and, when applied to a bulkhead panel, small lines tend to appear from the sweeping operation used during application.

Numerous approaches have been suggested in the prior art for forming laminar structures having fire-resistant characteristics. Typical of these disclosures are those found in, for example, U.S. Pat. Nos. 3,092,530-Plummer (a heat protective sheathing for missiles employing an aluminum foil lamination); 3,677,882-Jahns, Jr. (an industrial laminate, including, inter alia, a copper foil and a polyvinyl/flouride film); 4,105,820-Antoni (a laminate including an aluminum foil sheet and polyethylene films); 4,170,675-Greengrass (superimposed layers of metal foils, plastics and wire mesh); 4,282,276-Smith (a laminate including layers of Kraft paper, fiberglass and aluminum foil); 4,292,353-Ohashi et al and 4,296,170-Ohashi et al (laminates including a urethane modified polyisocyanurate foam as a core material and an aluminum foil sheet as a surface material bonded thereto); 4,395,453-Lines, Jr. et al (a multi-layered laminate including laminations of aluminum and fibrous materials); and, 4,401,707-Bailey et al (a multi-layered fabric including foil/fabric laminations).

Other representative patents of interest include U.S. Pat. Nos.: 3,655,426-Fuchs; 3,767,500-Tally et al; 4,054,710-Botsolas; and, 4,054,711-Botsolas; all of which disclose various types of laminar structures including, inter alia, one or more sheets of polyvinyl/flouride and one or more sheets of aluminum foil. Moreover, U.S. Pat. No. 3,616,192-Sinclair discloses decorative polyvinyl/flouride laminations incorporating specific printing ink formulations for providing a decorative image on the polyvinyl/flouride film which has desired inert properties.

In general, however, the foregoing patents simply do not relate to lightweight, flexible, fire-resistant, decorative laminates of the type employing aluminum foil sheets wherein provision is made for enabling the use of relatively thin aluminum foil sheets having thicknesses on the order of approximately 0.0007" without encountering the wrinkling problems generally associated with such foil sheets, and wherein adhesive bonding of the foil sheets to an underlying flexible panel-like base lamination formed, for example, of paper, is simplified.

SUMMARY OF THE INVENTION

Composite, lightweight, flexible, fire-resistant, decorative laminates in the form of flexible wall coverings for bulkhead panels in commercial aircraft are disclosed which are characterized by their ability to meet, and exceed, code regulations established by the FAA such as Regulation "FAR 25"; and, which enable use of relatively thin—e.g., on the order of only 0.0007"—fire-resistant aluminum foil sheets bonded directly to an inert polyvinyl/flouride film so as to enhance the ability to adhesively bond the aluminum foil to an underlying flexible paper-like panel or the like while minimizing, and virtually eliminating, the wrinkling problem inherent with the use of such aluminum foil sheets. More specifically, the composite, flexible, fire-resistant, decorative laminates of the present invention include: (i) a laminar fire-resistant layer including an aluminum foil sheet bonded to a first inert polyvinyl/flouride sheet; (ii) an underlying flexible, paper-like base lamination; (iii) means for adhesively bonding the first polyvinyl/flouride sheet to the panel-like base lamination; (iv) a resinous embossing film overlying and in face-to-face bonded relation to the aluminum foil sheet; (v) sheet defining means having an outer decorative surface and in overlying face-to-face bonded engagement with the resinous embossing film; and (vi), an outer transparent sheet of clear polyvinyl/flouride overlying and in bonded face-to-face relation with the decorative surface of the sheet defining means. The resulting flexible, fire-resistant decorative laminates are characterized by their improved fire-resistant characteristics, reduced smoke and/or toxic fume emission, reduced flame spreading, non-dripping and non-blistering characteristics when subjected to flame and/or heat, and by their durability and ease of maintenance in use. The invention further relates to improved methods for forming such composite, flexible, fire-resistant, decorative laminates.

More specifically, it is a general aim of the present invention to provide improved flexible, fire-resistant, decorative laminates suitable for use as interior wall and/or bulkhead panel coverings in commercial aircraft and the like, and improved methods for manufacture thereof, which permit of incorporation of an interior lamination of relatively thin fire-resistant aluminum foil without encountering the normal wrinkling problems inherent with handling of such material, and which readily permit bonding of the aluminum foil to an underlying flexible paper or paper-like base lamination; and, wherein the decorative surface of the composite, fire-resistant laminate is protected by an outer lamination of clear, transparent polyvinyl/flouride, thereby enhancing the maintenance characteristics of the laminate in use.

A further and more specific objective of the invention is the provision of improved composite, flexible, fire-resistant, decorative laminates and method of manufacture thereof characterized by their ability to meet and exceed the fire resistance standards promulgated by the FAA—specifically, Regulation "FAR 25".

BRIEF DESCRIPTION OF THE DRAWINGS

These and other objects and advantages of the present invention will become more readily apparent upon reading the following detailed description and upon reference to the attached drawing, in which.

Figure 1:
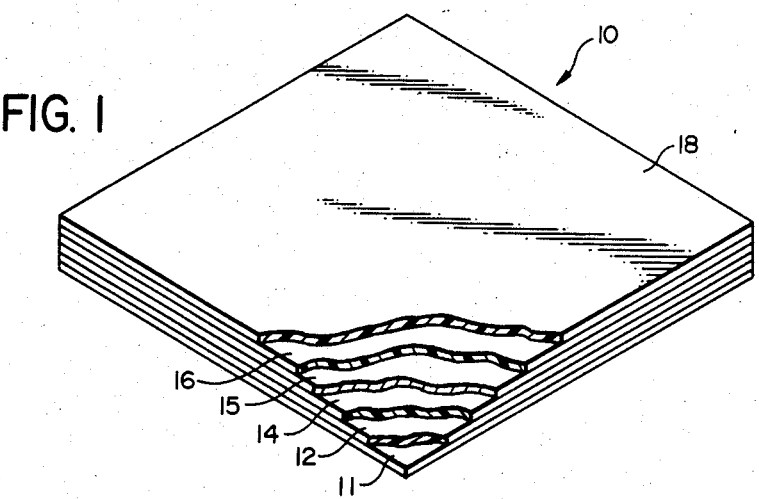
FIG. 1 is a fragmentary perspective view of a portion of composite, flexible, fire-resistant, decorative laminate or wall covering embodying features of, and made in accordance with, the present invention, here depicting successive laminations progressively cut away so as to expose portions of the underlying laminations.

While the invention is susceptible of various modifications and alternative forms, specific embodiments thereof have been shown by way of example in the drawing and will herein be described in detail. It should be understood, however, that it is not intended to limit the invention to the particular forms disclosed; but, on the contrary, the intention is to cover all modifications, equivalents and alternatives falling within the spirit and scope of the invention as expressed in the appended claims.

DETAILED DESCRIPTION

Turning now to the drawing, there has been illustrated in FIG. 1, a composite, flexible, fire-resistant, decorative laminate suitable for use as a wall covering, generally indicated at 10, embodying the features of, and made in accordance with, the present invention. Thus, as here shown, the illustrative laminate 10 includes: (i) a flexible, panel-like, base lamination 11 which may be formed of, for example, paper; (ii) a superimposed layer 12 of any suitable adhesive material; (iii) a layer 14 of inert polyvinyl/flouride adhesively bonded on its undersurface to the adjacent layer 12 of adhesive material; (iv) an intermediate layer 15 of relatively thin, fire-resistant aluminum foil—e.g., a layer 15 having a thickness on the order of approximately 0.0007"—(v) any suitable and conventional resinuous embossing film 16 disposed in overlying face-to-face bonded engagement with the aluminum foil lamination 15; and (vi), an uppermost or outer exposed decorative sheet 18 which may itself comprise a laminar structure.

In keeping with the present invention, the lamination 10 depicted in FIG. 1 is preferably formed by initially fabricating, in any suitable and completely conventional sheet laminating system, an inner laminate comprising a continuous sheet of aluminum foil 15 which is bonded directly to an underlying continuous inert polyvinyl/flouride lamination 14. Thus, the arrangement is such that relatively thin and lightweight sheets of fire-resistant aluminum foil 15—for example, sheets on the order of only 0.0007" thick—are bonded directly to, and in face-to-face relation with, an inert polyvinyl/flouride lamination 14 which may be on the order of 0.002" thick so as to form a relatively thin foil/polyvinyl/flouride laminate 15/14 which can then be handled with relative ease during subsequent steps in the overall fabricating process without encountering the wrinkling and/or creasing problems inherently faced when dealing with thin aluminum foil sheets. Moreover, the provision of an inert polyvinyl/flouride lamination integral with the aluminum foil facilitates bonding of the laminate 14/15 to an underlying base lamination 11 formed of paper or paper-like material.

Having formed the aluminum foil/polyvinyl/flouride laminate 15/14, and in keeping with the invention, the continuous, integral, fire-resistant laminate 15/14 is adhesively bonded to the underlying paper or paper-like base lamination 11 by means of any suitable conventional and compatible adhesive material 12. Thereafter, a conventional resinous embossing film 16 is applied in overlying face-to-face bonded relation to the aluminum foil lamination 15. Finally, any desired exposed flexible decorative sheet, lamination and/or laminate 18 is bonded to the resinous embossing film 16 to form a composite, flexible, fire-resistant, decorative laminate in accordance with, and embodying the features of, the present invention.

If desired, those skilled in the art will appreciate that the adhesive laminate 12 and paper or paper-like base lamination 11 may simply comprise the lower removable paper sheet and intermediate adhesive lamination of any conventional, commercially available paper/adhesive/paper laminate (not shown) from which one outer paper lamination has been removed prior to adhesively bonding the foil/polyvinyl/flouride laminate 15/14 to the underlying paper-like base lamination 11. As a consequence of this arrangement, when the flexible, fire-resistant, decorative laminate 10 is to be installed as a wall covering on the interior bulkhead panels of a commercial aircraft or the like, it is merely necessary to remove the underlying paper lamination 11 from the laminate, thus exposing the adhesive surface 12 which can then be placed in contact with, and adhesively bonded to, the underlying bulkhead panel structure (not shown).

Figure 2:
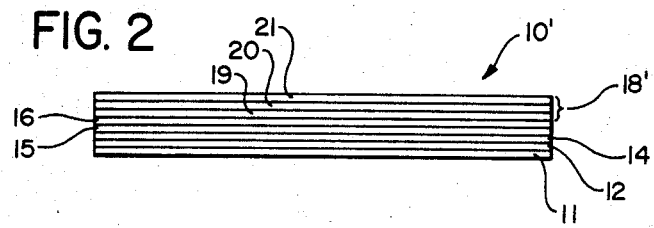
FIG. 2 is a side elevational view in diagramatic form here depicting a wall covering embodying the invention having eight (8) discrete laminations and wherein the decorative surface of the laminate is defined by a silk-screened ink image formed on an underlying polyvinyl/flouride film or sheet and underlying a superimposed protective sheet or film of polyvinyl/flouride; and, FIG. 3 is a diagramatic side elevational view similar to FIG. 2, but here depicting a modified form of the invention employing only seven (7) discrete laminations wherein the decorative surface of the composite laminate comprises a photograph or print having a superimposed protective polyvinyl/flouride coating bonded on the decorative surface thereof.

Turning next to FIG. 2, there has been illustrated a modified form of composite, flexible, fire-resistant, decorative laminate, generally indicated at 10', which is here shown as consisting of eight (8) discrete laminations as opposed to the six (6) discrete laminations depicted in FIG. 1. In this instance, the outer or exposed decorative sheet 18' itself comprises a laminar construction consisting of: (i) a sheet of polyvinyl/flouride 19, which may be on the order of 0.002" thick, in overlying, face-to-face, bonded relation to the resinous embossing film 16; (ii) an image defining lamination 20 formed, for example, by a conventional silkscreening process; and (iii), an outer protective transparent lamination 21 of clear polyvinyl/flouride which may, for example, be on the order of about 0.001" thick. Thus, the outermost inert polyvinyl/flouride coating 21 serves to protect the silkscreen image 20 and permits of ease of maintenance in use, permitting the laminate 10' to be wiped or washed without damaging the decorative silkscreened image 20.

Figure 3:
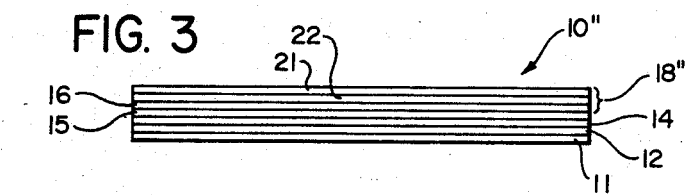

Referring to FIG. 3, yet another modified form of the invention has been depicted which is similar to those shown in FIGS. 1 and 2. Thus, as here shown, the modified laminate, generally indicated at 10'', includes seven (7) discrete laminations wherein the outermost exposed decorative sheet 18'' comprises a laminar structure having an inner lamination 22—which may comprise a photograph, print or the like—and an outer, transparent, protective, clear, polyvinyl/flouride lamination 21 identical to that previously described in conjunction with FIG. 2.

Flexible, fire-resistant, decorative laminates of the type described herein have been produced on a mass-production basis without evidencing any of the problems heretofor encountered when attempting to form fire-resistant laminates having relatively thin, aluminum foil laminations. The inert foil/polyvinyl/flouride laminate 15/14 permits of ease of handling during the fabricating process, and permits of formation of desired laminates having excellent decorative characteristics in terms of texture; while, at the same time, permitting the laminate to be applied to bulkhead panels with ease and without producing undesired lines in the finished products. Flame tests performed on panels incorporating the invention have been conducted in accordance with FAA Fire Code Regulation FAR 25.853; and, such tests have demonstrated that the composite, flexible laminate fully meets and exceeds the code requirements and produces an average burn length of 4.0''.

While the present invention has been described in connection with exemplary flexible, fire-resistant, decorative laminates employing laminations of particular described thicknesses, those skilled in the art will readily appreciate that the particular thickness of the various laminations may vary without departing from the spirit and scope of the invention in its broadest aspects. Thus, while foil laminations 15 of 0.0007'' and thicker have been tested when bonded to polyvinyl/flouride films 14 on the order of 0.002'' thick, the invention permits of use of thinner foil and/or polyvinyl/flouride films if desired. Moreover, the thickness of the polyvinyl/flouride films 19 and 21 (See, FIGS. 2 and 3) may readily be increased and/or decreased dependent only upon the end results desired. Suffice it to say that the important features of the invention include the formation of an intermediate fire-resistant metal foil/inert film laminate 15/14 which permits ease of handling of the metal foil in the fabricating process without undue danger of creasing and/or wrinkling of the foil, together with the use of inert materials such as polyvinyl/flouride to form a transparent protective coating for the flexible laminate.

What is claimed is:

1. A flexible, fire-resistant, decorative laminate comprising, in combination:
   a. a flexible panel-like base lamination;
   b. a laminar fire-resistant lamination comprising: (i) a first sheet of polyvinyl fluoride adapted to be positioned in face-to-face overlying relation to said flexible panel-like base lamination; and (ii), an aluminum foil sheet overlying said first sheet and bonded thereto;
   c. means adhesively bonding said first sheet to said flexible panel-like base lamination;
   d. a resinous embossing film overlying and in face-to-face bonded relation to said aluminum foil sheet; and,
   e. a laminar decorative sheet overlying and in face-to-face bonded relation to said resinous embossing film, said laminar decorative sheet comprising: (iii) sheet defining means having an outer decorative surface and in face-to-face bonded engagement with said resinous embossing film; and (iv), an outer transparent sheet of clear polyvinyl fluoride overlying and in bonded face-to-face relation with said sheet defining means and forming the outer exposed surface of said flexible, fire-resistant, decorative laminate, said sheet defining means having an outer decorative surace comprising a third sheet of polyvinyl fluoride with an image defining layer and wherein said second sheet of clear polyvinyl fluoride is bonded to, and in face-to-face overlying relation with, said third sheet of polyvinyl fluoride with said image defining layer sandwiched therebetween.

2. A flexible, fire-resistant, decorative laminate as set forth in claim 1 wherein said image defining layer comprises a photograph.

3. A flexible, fire-resistant, decorative laminate as set forth in claim 1 wherein said image defining layer comprises a flexible sheet having a decorative print formed on its outer surface.

4. A flexible, fire-resistant, decorative laminate as set forth in claims 1, 2 or 3 wherein said first sheet of polyvinyl fluoride is on the order of 0.002" thick.

5. A flexible, fire-resistant, decorative laminate as set forth in claims 1, 2 or 3 wherein said aluminum foil sheet is on the order of 0.0007" thick.

6. A flexible, fire-resistant, decorative laminate as set forth in claims 1, 2 or 3 wherein said first sheet of polyvinyl fluoride is on the order of 0.002" thick and said aluminum foil sheet is on the order of 0.0007" thick.

7. A flexible, fire-resistant, decorative laminate as set forth in claims 1, 2 or 3 wherein said flexible panel-like base lamination is formed of paper.

8. A flexible, fire-resistant, decorative laminate as set forth in claims 1, 2 or 3 wherein said outer transparent sheet of clear polyvinyl fluoride is on the order of 0.001" thick.

9. A flexible, fire-resistant, decorative laminate as set forth in claim 4 wherein said outer transparent second sheet of clear polyvinyl fluoride is on the order of 0.001" thick.

10. A flexible, fire-resistant, decorative laminate as set forth in claim 5 wherein said outer transparent second sheet of clear polyvinyl fluoride is on the order of 0.001" thick.

11. A flexible, fire-resistant, decorative laminate as set forth in claim 5 wherein said outer transparent second sheet of clear polyvinyl fluoride is on the order of 0.001" thick.

12. A flexible, fire-resistant, decorative laminate comprising, in combination:
   a. a flexible panel-like base lamination;
   b. a laminar fire-resistant lamination comprising: (i) a first sheet of polyvinyl fluoride adapted to be positioned in face-to-face overlying relation to said flexible panel-like base lamination; and (ii), an aluminum foil sheet overlying said first sheet and bonded thereto;
   c. means adhesively bonding said first sheet to said flexible panel-like base lamination;
   d. a resinous embossing film overlying and in face-to-face bonded relation to said aluminum foil sheet; and,
   e. a laminar decorative sheet overlying and in face-to-face bonded relation to said resinous embossing film, said laminar decorative sheet comprising: (iii) sheet defining means having an outer decorative surface and in face-to-face bonded engagement with said resinous embossing film; and (iv), an outer transparent sheet of clear polyvinyl fluoride overlying and in bonded face-to-face relation with said sheet defining means and forming the outer exposed surface of said flexible, fire-resistant, decorative laminate; and, wherein said sheet defining means having an outer decorative surface comprises a third sheet of polyvinyl fluoride having a silkscreened image applied thereto and wherein said second sheet of clear polyvinyl fluoride is bonded to, and in face-to-face overlying relation with, said third sheet of polyvinyl fluoride with said silkscreened image sandwiched therebetween.

13. A flexible, fire-resistant, decorative laminate as set forth in claim 12 wherein said first sheet of polyvinyl fluoride is on the order of 0.002" thick.

14. A flexible, fire-resistant, decorative laminate as set forth in claim 12 wherein said aluminum foil sheet is on the order of 0.0007" thick.

15. A flexible, fire-resistant, decorative laminate as set forth in claim 12 wherein said first sheet of polyvinyl fluoride is on the order of 0.002" thick and said aluminum foil sheet is on the order of 0.0007" thick.

16. A flexible, fire-resistant, decorative laminate as set forth in claim 12 wherein said flexible panel-like base lamination is formed of paper.

17. A flexible, fire-resistant, decorative laminate as set forth in claim 12 wherein said outer transparent sheet of clear polyvinyl fluoride is on the order of 0.001" thick.

18. A flexible, fire-resistant, decorative laminate as set forth in claim 13 wherein said outer transparent second sheet of clear polyvinyl fluoride is on the order of 0.001" thick.

19. A flexible, fire-resistant, decorative laminate as set forth in claim 14 wherein said outer transparent second sheet of clear polyvinyl fluoride is on the order of 0.001" thick.

20. A flexible, fire-resistant, decorative laminate as set forth in claim 15 wherein said outer transparent second sheet of clear polyvinyl fluoride is on the order of 0.001" thick.

21. A flexible, fire-resistant, decorative laminate as set forth in claim 12 wherein said third sheet of polyvinyl fluoride is on the order of 0.002" thick.

22. A flexible, fire-resistant, decorative laminate as set forth in claim 21 wherein said first sheet of polyvinyl fluoride is on the order of 0.002" thick.

23. A flexible, fire-resistant, decorative laminate as set forth in claim 21 wherein said aluminum foil sheet is on the order of 0.0007" thick.

24. A flexible, fire resistant, decorative laminate as set forth in claim 21 wherein said first sheet of polyvinyl fluoride is on the order of 0.002" thick and said aluminum foil sheet is on the order of 0.0007" thick.

25. The method of forming a composite, flexible, fire-resistant, decorative laminate comprising the steps of:
   a. forming a laminar fire-resistant laminate by bonding an aluminum foil sheet in face-to-face overlying relation to a first sheet of polyvinyl fluoride;
   b. adhesively bonding the first sheet of polyvinyl fluoride to a flexible panel-like base lamination;
   c. bonding a resinous embossing film to, and in face-to-face overlying relation with, the aluminum foil sheet;
   d. bonding sheet defining means having an outer decorative surface to, and in face-to-face overlying relation with, the resinous embossing film; and,
   e. bonding an outer transparent second sheet of clear polyvinyl fluoride to, and in face-to-face overlying relation with, the outer decorative surface of the sheet defining means so as to form a transparent, protective, outer exposed surface on the composite, flexible, fire-resistant, decorative laminate; and, f. said method being further characterized in that the sheet defining means having an outer decorative surface comprises a third sheet of polyvinyl fluoride with an image defining layer and wherein the second sheet of clear polyvinyl fluoride is bonded to, and in face-to-face overlying relation with, the image defining layer sandwiched therebetween.

26. The method of forming a composite flexible, fire-resistant, decorative laminate as set forth in claim 25 wherein the image defining layer comprises a photograph.

27. The method of forming a composite flexible, fire-resistant, decorative laminate as set forth in claim 25 wherein the image defining layer comprises a flexible sheet having a decorative print formed on its outer surface.

28. The method of forming a composite flexible, fire-resistant, decorative laminate as set forth in claims 25, 26 or 27 wherein the first sheet of polyvinyl fluoride is on the order of 0.002" thick.

29. The method of forming a composite flexible, fire-resistant, decorative laminate as set forth in claims 25, 26 or 27 wherein the aluminum foil sheet is on the order of 0.0007" thick.

30. The method of forming a composite flexible, fire-resistant, decorative laminate as set forth in claims 25, 26 or 27 wherein the first sheet of polyvinyl fluoride is on the order of 0.002" thick and the aluminum foil sheet is on the order of 0.0007" thick.

31. The method of forming a composite flexible, fire-resistant, decorative laminate as set forth in claims 25, 26 or 27 wherein the outer transparent second sheet of polyvinyl fluoride is on the order of 0.001" thick.

32. The method of forming a composite flexible, fire-resistant, decorative laminate as set forth in claim 28 wherein the outer transparent second sheet of, polyvinyl fluoride is on the order of 0.001" thick.

33. The method of forming a composite flexible, fire-resistant, decorative laminate as set forth in claim 29 wherein the outer transparent second sheet of polyvinyl fluoride is on the order of 0.001" thick.

34. The method of forming a composite flexible, fire-resistant, decorative laminate as set forth in claim 30 wherein the outer transparent second sheet of polyvinyl fluoride is on the order of 0.001" thick.

35. The composite, flexible, fire-resistant, decorative laminate produced by the method set forth in claim 25.

36. The method of forming a composite, flexible, fire-resistant, decorative laminate comprising the steps of:
a. forming a laminar fire-resistant laminate by bonding an aluminum foil sheet in face-to-face overlying relation to a first sheet of polyvinyl fluoride;
b. adhesively bonding the first sheet of polyvinyl fluoride to a flexible panel-like base lamination;
c. bonding a resinous embossing film to, and in face-to-face overlying relation with, the aluminum foil sheet;
d. bonding sheet defining means having an outer decorative surface to, and in face-to-face overlying relation with, the resinous embossing film; and,
e. bonding an outer transparent second sheet of clear polyvinyl fluoride to, and in face-to-face overlying relation with, the outer decorative surface of the sheet defining means so as to form a transparent, protective, outer exposed surface on the composite, flexible, fire-resistant, decorative laminate; and,
f. wherein the sheet defining means having an outer decorative surface comprises a third sheet of polyvinyl fluoride having a silkscreened image applied thereto and wherein the second sheet of clear polyvinyl fluoride is bonded to, and in face-to-face overlying relation with, the third sheet of polyvinyl fluoride with the silkscreened image sandwiched therebetween.

37. The composite, flexible, fire-resistant, decorative laminate produced by the method set forth in claim 36.

38. The method of forming a composite flexible, fire-resistant, decorative laminate as set forth in claim 36 wherein the first sheet of polyvinyl fluoride is on the order of 0.002" thick.

39. The method of forming a composite flexible, fire-resistant, decorative laminate as set forth in claim 36 wherein the aluminum foil sheet is on the order of 0.0007" thick.

40. The method of forming a composite flexible, fire-resistant, decorative laminate as set forth in claim 36 wherein the first sheet of polyvinyl fluoride is on the order of 0.002" thick and the aluminum foil sheet is on the order of 0.0007" thick.

41. The method of forming a composite flexible, fire-resistant, decorative laminate as set forth in claim 36 wherein the outer transparent second sheet of polyvinyl fluoride is on the order of 0.001" thick.

42. The method of forming a composite flexible, fire-resistant, decorative laminate as set forth in claim 38 wherein the outer transparent second sheet of polyvinyl fluoride is on the order of 0.001" thick.

43. The method of forming a composite flexible, fire-resistant, decorative laminate as set forth in claim 39 wherein the outer transparent second sheet of polyvinyl fluoride is on the order of 0.001" thick.

44. The method of forming a composite flexible, fire-resistant, decorative laminate as set forth in claim 40 wherein the outer transparent second sheet of polyvinyl fluoride is on the order of 0.001" thick.

45. The method of forming a composite flexible, fire-resistant, decorative laminate as set forth in claim 36 wherein the third sheet of polyvinyl fluoride is on the order of 0.002" thick.

46. The method of forming a composite flexible, fire-resistant, decorative laminate as set forth in claim 45 wherein the first sheet of polyvinyl fluoride is on the order of 0.002" thick.

47. The method of forming a composite flexible, fire-resistant, decorative laminate as set forth in claim 45 wherein the aluminum foil sheet is on the order of 0.0007" thick.

48. The method of forming a composite flexible, fire-resistant, decorative laminate as set forth in claim 45 wherein the first sheet of polyvinyl fluoride is on the order of 0.002" thick and the aluminum foil sheet is on the order of 0.0007" thick.

* * * * *